US011926281B2

United States Patent
Boekenbrink et al.

(10) Patent No.: US 11,926,281 B2
(45) Date of Patent: Mar. 12, 2024

(54) CALCULATION MEANS, ARRANGEMENT AND METHOD FOR DETERMINING THE POSITION OF AN AUTHENTICATION MEANS FOR A VEHICLE

(71) Applicant: HELLA GmbH & Co. KGaA, Lippstadt (DE)

(72) Inventors: Maik Boekenbrink, Langenberg (DE); Sebastian Henke, Warstein (DE)

(73) Assignee: Hella GmbH & CO. KGAA, Lippstadt (DE)

( * ) Notice: Subject to any disclaimer, the term of this patent is extended or adjusted under 35 U.S.C. 154(b) by 504 days.

(21) Appl. No.: 17/188,396

(22) Filed: Mar. 1, 2021

(65) Prior Publication Data
US 2021/0179017 A1   Jun. 17, 2021

Related U.S. Application Data

(63) Continuation of application No. PCT/EP2019/072108, filed on Aug. 19, 2019.

(30) Foreign Application Priority Data

Aug. 31, 2018  (DE) ............... 10 2018 121 289.5
Oct. 22, 2018   (DE) ............... 10 2018 126 219.1

(51) Int. Cl.
*B60R 25/01*   (2013.01)
*B60R 25/24*   (2013.01)
(Continued)

(52) U.S. Cl.
CPC ............ *B60R 25/01* (2013.01); *B60R 25/245* (2013.01); *G01S 13/78* (2013.01); *G01S 13/878* (2013.01); *G01S 13/88* (2013.01); *H01Q 1/3283* (2013.01)

(58) Field of Classification Search
CPC ....... B60R 25/01; B60R 25/245; G01S 13/78; G01S 13/878; G01S 13/88; H01Q 1/3283; G07C 2209/63; G07C 9/00309
(Continued)

(56) References Cited

U.S. PATENT DOCUMENTS 9,563,990 B2    2/2017  Khan et al.
9,963,106 B1 *  5/2018  Ricci ................ B60R 25/2018
(Continued)

FOREIGN PATENT DOCUMENTS

DE   102013224152 A1   5/2015
WO   WO2013072489 A1   5/2013
(Continued)

OTHER PUBLICATIONS

International Search Report dated Dec. 16, 2019 in corresponding application PCT/EP2019/072108.

*Primary Examiner* — Jonathan M Dager
*Assistant Examiner* — Jean W Charleston
(74) *Attorney, Agent, or Firm* — Muncy, Geissler, Olds & Lowe, P.C.

(57) ABSTRACT

A system for determining an angle $\alpha$ between a longitudinal axis of a vehicle and an authenticator, in particular a key or a keyless entry device for a vehicle, wherein the angle $\alpha$ can be calculated with the system using the formula $\alpha=(d_r-d_l)*k_w$, where $d_r$ is the calculated and/or measured distance to the authenticator from an antenna mounted on the right side in or on the vehicle, $d_l$ is the calculated and/or measured distance to the authenticator from an antenna mounted on the left side on the vehicle, and $k_w$ is a correction factor for the angle calculation that is established in a vehicle-specific manner.

13 Claims, 2 Drawing Sheets

(51) Int. Cl.
*G01S 13/78* (2006.01)
*G01S 13/87* (2006.01)
*G01S 13/88* (2006.01)
*H01Q 1/32* (2006.01)

(58) Field of Classification Search
USPC .......................................................... 701/2
See application file for complete search history.

(56) References Cited

U.S. PATENT DOCUMENTS

| | | | |
|---|---|---|---|
| 10,207,678 | B2 | 2/2019 | Khan et al. |
| 2003/0058086 | A1* | 3/2003 | Hara .................... B60R 25/245 340/425.5 |
| 2008/0092443 | A1 | 4/2008 | Herman et al. |
| 2013/0063247 | A1* | 3/2013 | Blatz .................. G07C 9/00309 340/5.72 |
| 2013/0069760 | A1* | 3/2013 | Lickfelt ................ H04B 17/29 455/67.11 |
| 2015/0149042 | A1* | 5/2015 | Cooper ................ B60R 25/245 701/48 |
| 2016/0259033 | A1 | 9/2016 | Vladimirov et al. |
| 2018/0012427 | A1* | 1/2018 | Ricci .................. G08G 1/09626 |
| 2018/0081025 | A1 | 3/2018 | Jonsson et al. |
| 2019/0344750 | A1* | 11/2019 | Takata ................. B60W 30/06 |
| 2019/0372975 | A1* | 12/2019 | Schwindt ............ H04L 63/0876 |
| 2020/0122686 | A1* | 4/2020 | Siswick ................ B60R 25/01 |
| 2021/0009079 | A1* | 1/2021 | Bourassi ............... B60R 25/01 |

FOREIGN PATENT DOCUMENTS

| | | |
|---|---|---|
| WO | WO2015010734 A1 | 1/2015 |
| WO | WO2016156231 A1 | 10/2016 |
| WO | WO2016174267 A1 | 11/2016 |

* cited by examiner

CALCULATION MEANS, ARRANGEMENT AND METHOD FOR DETERMINING THE POSITION OF AN AUTHENTICATION MEANS FOR A VEHICLE

This nonprovisional application is a continuation of International Application No. PCT/EP2019/072108, which was filed on Aug. 19, 2019, and which claims priority to German Patent Application No. 10 2018 121 289.5, which was filed in Germany on Aug. 31, 2018 and German Patent Application No. 10 2018 126 219.1, which was filed in Germany on Oct. 22, 2018, and which are all herein incorporated by reference.

BACKGROUND OF THE INVENTION

Field of the Invention

The present invention relates to a system, an arrangement, and a method for position determination of an authenticator for a vehicle. In particular, the system is able to calculate the angle enclosed between a vehicle longitudinal axis and an authenticator and to determine the distance between a vehicle center and an authenticator.

Description of the Background Art

Known authorization systems for vehicles, such as so-called keyless entry systems, for example, do not require a user to hold an authorization means or a key in his hand to initiate certain actions. With such systems, it is thus possible, for example, to unlock a vehicle without actively using an authenticator, in particular a key or a keyless entry means, and to start the vehicle by merely pressing a start button.

In systems from the prior art, the vehicle sends a weak signal with a range of a few meters that the authorization means receives. In response, the authenticator sends a signal to the vehicle, which the vehicle uses to decide whether it is a valid authorization means and, based thereon, whether access or driving authorization commands can be implemented.

As an improvement, it is known that vehicles are equipped with a light control that responds to the approach of an authenticator. Thus, for example, a vehicle is disclosed from DE 10 2013 224 152 in which a front light activation process is carried out in the event of an authorization of a valid user.

To an increasing extent, vehicle assistance systems are being provided that have reliable localization of the authenticator as a prerequisite. In many cases it is no longer sufficient to only detect the mere approach of an authenticator to the vehicle. For some applications, the position of the authenticator is required.

SUMMARY OF THE INVENTION

It is therefore an object of the present invention to provide to disclose a system for establishing an angle enclosed between the vehicle longitudinal axis and the authenticator, to propose an arrangement for such a system, and to introduce a method for operating such an arrangement, which makes it possible to carry out a very accurate position determination of the authenticator.

Also provided is a system for determining a corrected distance with the origin in the vehicle center, an arrangement for such a system, and a method for operating such an arrangement.

A system according to the invention, for determining an angle $\alpha$ between a longitudinal axis of a vehicle and an authenticator, in particular a key or a keyless entry system for a vehicle, calculates the angle $\alpha$ using the formula $\alpha = (d_r - d_l) * k_w$, where $d_r$ is the calculated and/or measured distance to the authenticator from an antenna mounted on the right side in or on the vehicle, $d_l$ is the calculated and/or measured distance to the authenticator from an antenna mounted on the left side on the vehicle, and $k_w$ is a correction factor for the angle calculation that is established in a vehicle-specific manner.

It can be possible to determine the correction factor for the angle calculation for each vehicle type by a measurement, and to make this available to the system.

In the present invention, the determination of the correction factor shall be explained using a series of measurements shown by way of example.

In this case, the authenticator is positioned on an accurately defined location, and the angle is determined for this known enclosed angle on the basis of the formula explained above. The accuracy of the correction factor can thus be adjusted.

| | Result with low correction factor $\alpha_{calculated}$ |
|---|---|
| Distance from the authenticator to the vehicle for $\alpha_{defined} = 15°$ | |
| 3 m | 14.3° |
| 4 m | 13.8° |
| 5 m | 14.3° |
| 6 m | 16.9° |
| 7 m | 13.2° |
| Distance from the authenticator to the vehicle for $\alpha_{defined} = 30$ | |
| 3 m | 27.5° |
| 4 m | 28.2° |
| 5 m | 29.5° |
| 6 m | 35.7° |
| 7 m | 34.2° |
| Distance from the authenticator to the vehicle for $\alpha_{defined} = 45$ | |
| 3 m | 37.1° |
| 4 m | 39.3° |
| 5 m | 40.0° |
| 6 m | 39.5° |
| 7 m | 49.1° |
| Distance from the authenticator to the vehicle for $\alpha_{defined} = 60$ | |
| 3 m | 48.3° |
| 4 m | 51.7° |
| 5 m | 50.2° |
| 6 m | 50.4° |
| 6.5 m | 49.5° |
| Distance from the authenticator to the vehicle for $\alpha_{defined} = 75°$ | |
| 3 m | 51.9° |
| 4 m | 53.3° |
| 5 m | 51.7° |
| 6 m | 64.0° |

Especially for large angles when the authenticator approaches the vehicle directly from the left or the right, it is evident that the calculated angles with the small correction factor become inaccurate. Here, it can be advantageous to calculate the stated formula with a large correction factor.

For the purpose of illustration, a comparison is given below for a constant distance of 5 meters and different correction factors.

| $\alpha_{defined}$ | Result with low correction factor $\alpha_{calculated, 1}$ | Result with high correction factor $\alpha_{calculated, 2}$ |
|---|---|---|
| 15° | 14.3° | 18° |
| 30° | 29.5° | 38° |
| 45° | 40° | 52° |
| 60° | 50.2° | 65° |
| 75° | 51.7° | 67° |

For large angles close to 90°, a more accurate position determination can be achieved with a large correction factor.

In order to carry out calculation of the formula, provision can be made that the system has inputs that can be used for transfer of the established distance $d_r$ and/or of the established distance $d_l$ and/or of an established difference $\Delta_d$ between these values ($d_r$, $d_l$).

It is likewise possible that the distances ($d_r$, $d_l$) can be calculated from the field strengths of at least two signals that are sent by two antennas mounted in or on the vehicle.

Advantageously, provision can be made that an authenticator, in particular a key or a keyless entry means for a vehicle, has a system.

The possibility also exists that the control unit has a system.

In addition, the invention relates to an arrangement for establishing an angle α between a longitudinal axis of a vehicle and an authenticator, in particular a key or a keyless entry means, for a vehicle.

The arrangement according to the invention has a system for carrying out the operations necessary for the angle calculation, as well as an authenticator with which an authorized user can approach the vehicle, a control unit that is mounted in or on a vehicle, at least two antennas that transmit signals that can be received by the authenticator, and other components that can be controlled by the control unit, such as a light control system, for example.

Advantageously, a motor vehicle is equipped with an arrangement according to the invention.

The method for operating an arrangement according to the invention has at least the following steps: the calculated and/or measured distances ($d_r$, $d_l$) are transferred to the system, and the enclosed angle (α) between vehicle (1) and authenticator (2) is calculated.

In the event that the system is to be provided in the authenticator (2), then the calculated angle (α) is transmitted from the system to the control unit (5). Normally, in establishing the distance between the authenticator and the vehicle, the distance is ascertained between the authenticator and the antenna mounted in or on the vehicle. Since the antennas are normally mounted on the external contour of the vehicle, the resultant distance is between the vehicle external contour and the authenticator.

In some cases, it is desirable for the distance from the authenticator to the central axis of the vehicle to be known.

As a solution for this case, the invention discloses a system for determining a corrected distance $d_{korr}$, wherein an origin of the distance $d_{r,l}$ is displaced to the vehicle central axis with the corrected distance $d_{korr}$, and can be calculated [sic; should say "and the distance can be calculated"] using the formula $$d_{korr} = \left(d_{r,l} + \left(\frac{FZB}{2}\right) * \left(\frac{\alpha}{90}\right)\right) * k_d,$$

wherein $d_r$ is the calculated distance to the authenticator (2) from an antenna (3) mounted on the right side in or on the vehicle (1), or $d_l$ is the calculated distance to the authenticator (2) from an antenna (4) mounted on the left side in or on the vehicle (1), FZB is the vehicle width, α is the angle established in claim 1, and $k_d$ is a correction factor for the distance calculation that is established in a vehicle-specific manner.

In addition, the invention relates to an arrangement for establishing a corrected distance $d_{korr}$, wherein an origin of the distance $d_{r,l}$ is displaced to the vehicle central axis with the corrected distance $d_{korr}$.

The arrangement according to the invention has a multiplicity of antennas, which are mounted apart from one another in or on a vehicle. Advantageously, the antennas are mounted in and/or on the vehicle on both the right and the left. It is entirely possible that additional antennas can be mounted, for example on a rear end or on a front end of the vehicle.

The arrangement also has a control unit that can be mounted in or on a vehicle and an authenticator, in particular a key or a keyless entry means for a vehicle.

Provision can be made that the arrangement includes a system that can be suitable for calculation of the angle α or another source that can be suitable for providing the angle α. In addition, provision can be made that the arrangement has a system that can be used for calculation of the corrected distance.

The method for operating an arrangement according to the invention for establishing a corrected distance has at least the following steps: the decision is made as to which side of the vehicle the authenticator is located on, the distance from the authenticator to the antenna located on this side of the vehicle is transferred to the system, the enclosed angle between vehicle and authenticator is calculated or transferred, and the corrected distance is calculated.

The advantage of the present invention is that a position determination of the authenticator is possible that goes beyond the mere distance. When an authorized person carrying the authenticator approaches the vehicle, it the authenticator is detected once a certain distance from the vehicle is reached. [sic; This sentence is probably meant to read either: "When . . . vehicle, the vehicle detects the authenticator once a certain distance is reached" or: "When . . . vehicle, the authenticator is detected once a certain distance from the vehicle is reached."] Through a combination of distance and angle of the authenticator relative to the vehicle, it has now become possible to trace the path of the authenticator as it approaches a vehicle. It is thus conceivable that vehicle assistance systems are tailored to this path and, for example, activate precisely the area where a user of the authenticator is walking. This may conceivably take place in an illumination of the path taken by the authorized person. Accurate position determination makes it possible, firstly, to increase the convenience experienced by the vehicle owner and, secondly, to also save energy when the vehicle assistance systems operate only in the area that is actually needed. Thus, in the case of an approach to the vehicle from the front right, it would be possible to illuminate only this area as a welcome light, and not the entire area around the vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
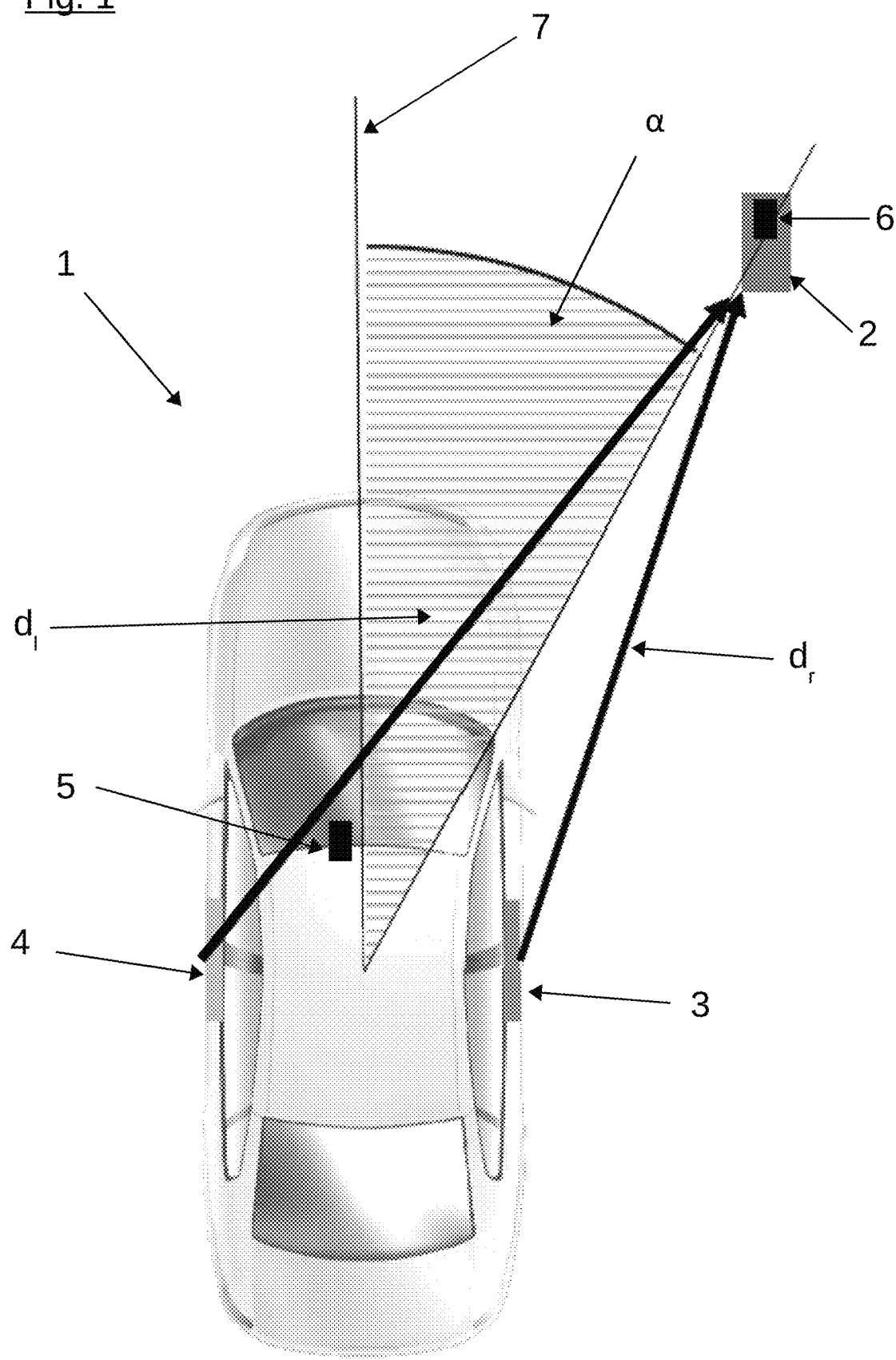
FIG. 1 shows a top view of an arrangement according to the invention having a vehicle and an authenticator for establishing an angle α between the longitudinal axis of the vehicle and the authenticator.

Shown in FIG. 1 is a schematic top view of a vehicle 1, in or on which are accommodated a multiplicity of antennas, in the present case two antennas 3, 4 by way of example. They are located in the region of the driver-side and passenger-side doors. A control unit 5 is likewise arranged in the vehicle 1.

The arrangement according to the invention additionally includes an authenticator 2, in particular a key or a keyless entry means for a vehicle 1. In the present embodiment, the authenticator 2 has a system 6. One possible embodiment of the arrangement according to the invention is that the system 6 can be arranged in the control unit 5 of the vehicle 1.

The system 6 is suitable for determining an angle α between the longitudinal axis of the vehicle 1 shown and the authenticator 2. The enclosed angle α is identified in FIG. 1 by the hatched area.

For calculation of the angle α, it is necessary for the distance $d_r$, $d_l$ from the authenticator to the two antennas 3, 4 mounted in or on the vehicle 1 to be known. For this purpose, the system 6 has inputs suitable for transfer of the established distances $d_r$, $d_l$ to the two antennas 3, 4 and/or the difference $\Delta_d$ of the two distances $d_r$, $d_l$.

In this case, the distances $d_r$, $d_l$ have already been measured or calculated in the vehicle 1 and transferred to the system 6. In addition, it is possible that the distances $d_r$, $d_l$ are calculated from the field strengths of the signals that are transmitted by the two antennas 3, 4 mounted in or on the vehicle. In this case, the system 6 is designed such that it can receive and process the signals of the antennas 3, 4.

If the necessary distance values $d_r$, $d_l$ of the antennas 3, 4 on the right and left sides are present in the system 6 as well as a vehicle-specific correction factor, which is stored in the control unit 5 of the vehicle and is sent to the system 6 or is stored in the system 6, then the system 6 is able to approximately calculate the angle α enclosed with the longitudinal axis 7 of the vehicle 1.

In the case that the system is to be provided in the authenticator 2, then the angle α is subsequently transmitted to the control unit 5 in the vehicle 1.

Figure 2:
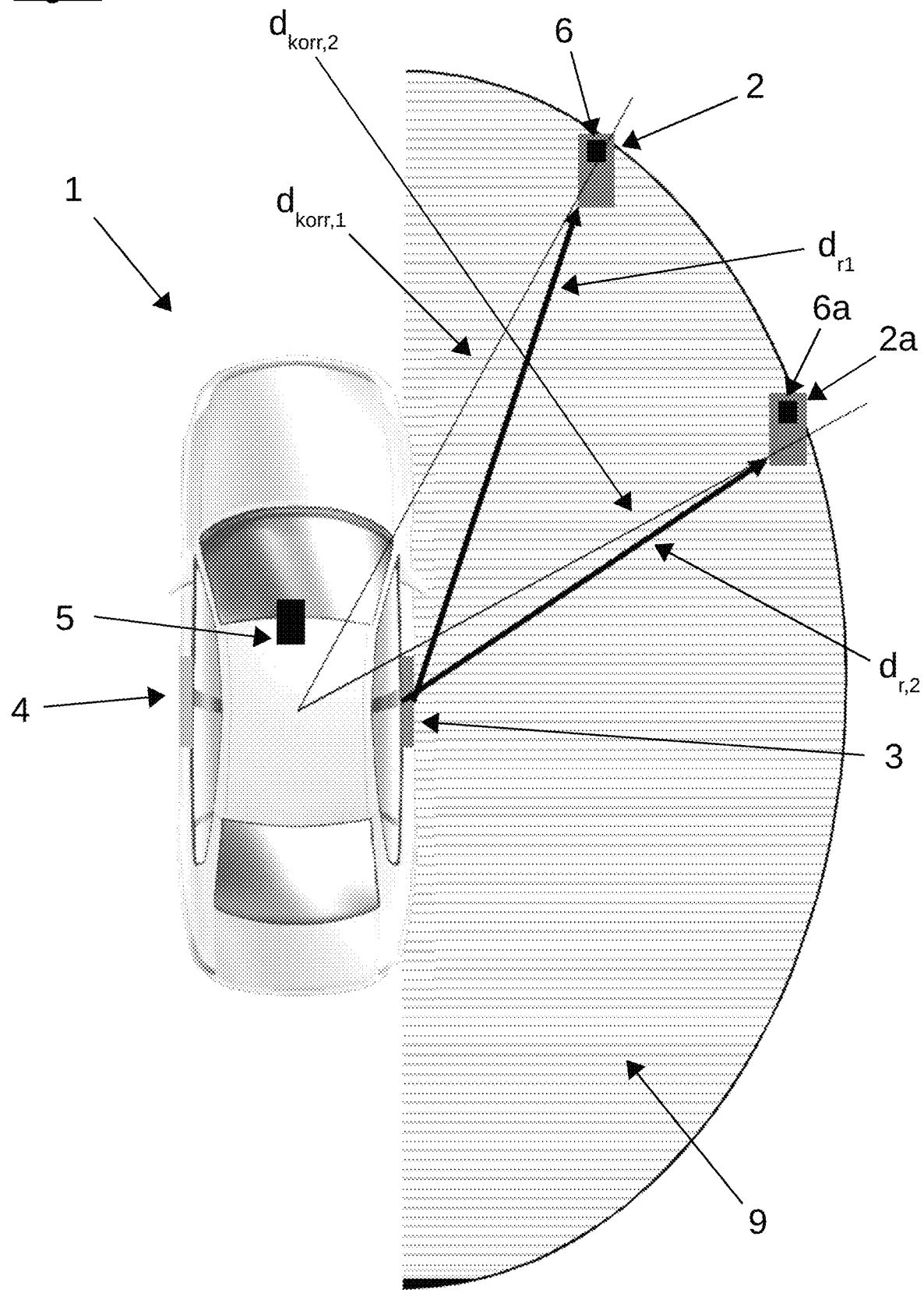
FIG. 2 shows a top view of an arrangement according to the invention having a vehicle and an authenticator for establishing a corrected distance, wherein the origin of the distance is displaced to the center point of the vehicle.

FIG. 2 shows an arrangement according to the invention for the calculation of a corrected distance, in which the origin of the distance is displaced to the vehicle central axis 7.

The present figure illustrates the case in which the authenticator 2 is approaching the vehicle 1 from the right-hand side 9. The embodiments can be applied equally well to the case in which the authenticator 2 approaches from the left side of the vehicle. Strictly for reasons of clarity, only one side is described here. This has no restrictive effect on the present invention.

The system 6, here arranged in the authenticator 2, either has the distance $d_r$, $d_l$ to the two antennas 3, 4 located in or on the vehicle 1 transmitted to it or calculates them to start with. It is likewise possible that the system 6 is arranged in the control unit 5 of the vehicle 1.

If the distances $d_r$, $d_l$ are transferred to the system 6, then the way in which the distances $d_r$, $d_l$ were established beforehand is irrelevant. Normally, the distances $d_r$, $d_l$ are calculated or measured, but other possibilities should not be precluded.

It is likewise necessary for a decision to be made as to which side 9 of the vehicle 1 the authenticator 2 is located on.

From the established distances $d_r$, $d_l$ the system 6 will calculate the angle α between the longitudinal axis 7 of the vehicle 1 and the authenticator 2.

The system 6 can calculate the distance from the authenticator 2 to the vehicle central axis 7 based on the known distance at which the authenticator 2 is located from the antenna $d_r$ on its vehicle side 9, the enclosed angle α, and a vehicle-specific distance correction factor that is stored in the control unit 5 of the vehicle 1 and is sent to the system 6 or is stored in the system 6.

This value is returned to the control unit 5 located in the vehicle 1 for further use.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for determining an angle α between a longitudinal axis of a vehicle and an authenticator for the vehicle, the system comprising:
    a first antenna; and
    a second antenna,
    wherein the angle between the longitudinal axis of the vehicle and the authenticator is calculated with the system using the formula:

$$\alpha = (d_r - d_l) * k_w,$$

wherein $d_r$ is a calculated and/or measured distance to the authenticator from the first antenna mounted on a right passenger side in or on the vehicle,
    wherein $d_l$ is a calculated and/or measured distance to the authenticator from the second antenna mounted on a left driver side in or on the vehicle, and
    wherein $k_w$ is a correction factor for the angle calculation that is pre-stored in the system and is specific to a vehicle type of the vehicle.

2. The system according to claim 1, wherein the system has inputs that are used for transfer of the distance $d_r$ and/or of the distance $d_l$ and/or of difference $\Delta_d$ between the distances ($d_r$, $d_l$).

3. The system according to claim 1, wherein the distances ($d_r$, $d_l$) are calculated from field strengths of at least two signals that are sent by the first and second antennas mounted in or on the vehicle.

4. An authenticator for a vehicle, the authenticator comprising the system according to claim 1.

5. The system according to claim 1, wherein the system further comprises a control unit for the vehicle, wherein the control unit determines the angle.

6. An arrangement for establishing an angle α between a longitudinal axis of a vehicle and an authenticator for a vehicle, the arrangement comprising:
   the system according to claim 1;
   an authenticator; and
   a control unit,
   wherein the control unit controls components of the vehicle, including a light control system.

7. A motor vehicle comprising the arrangement according to claim 6.

8. A method for operating the arrangement according to claim 6, the method comprising:
   transferring the calculated and/or measured distances ($d_r$, $d_l$) to the system; and
   calculating the angle between the longitudinal axis of the vehicle and the authenticator.

9. A system for determining a corrected distance $d_{korr}$ to an authenticator from a point on the vehicle longitudinal axis based on a distance ($d_r$, $d_l$) between at least one antenna arranged on a vehicle side and the authenticator, wherein the corrected distance $d_{korr}$ is calculated with the system using the formula:

$$d_{korr} = \left(d_{r,l} + \left(\frac{FZB}{2}\right) * \left(\frac{\alpha}{90}\right)\right) * k_d,$$

wherein $d_r$ is the calculated distance to the authenticator from an antenna mounted on a right passenger side in or on the vehicle or $d_l$ is the calculated distance to the authenticator from an antenna mounted on a left driver side in or on the vehicle, wherein FZB is a vehicle width,
wherein α is the angle between the longitudinal axis of the vehicle and the authenticator determined in claim 1, and
wherein $k_d$ is a correction factor for the corrected distance calculation that is that is pre-stored in the system and is specific to a vehicle type of the vehicle.

10. An arrangement for establishing a corrected distance $d_{korr}$ from a point on a vehicle longitudinal axis to an authenticator based on a distance ($d_r$, $d_l$) between an antenna arranged on a vehicle and the authenticator, comprising:
    at least two antennas that are mounted apart from one another in or on the vehicle;
    a control unit arranged in or on the vehicle;
    an authenticator for the vehicle; and
    a system according to claim 9 or another source for the provision of the angle α between the longitudinal axis of the vehicle and the authenticator and the corrected distance $d_{korr}$.

11. A method for operating an arrangement according to claim 10, wherein the method comprises:
    determining which side of the vehicle the authenticator is located on;
    transferring, to the system, the distance ($d_r$, $d_l$) from the authenticator to the antenna located on the side of the vehicle the authenticator is located on;
    calculating or transferring the angle α between the longitudinal axis of the vehicle and the authenticator; and
    calculating the corrected distance $d_{korr}$.

12. The system according to claim 1, wherein the authenticator is a key for a keyless entry system of the vehicle.

13. The system according to claim 1, wherein the first antenna is mounted on the vehicle on an opposite side of the longitudinal axis of the vehicle than the second antenna.

* * * * *